United States Patent
Kang et al.

(10) Patent No.: US 10,231,067 B2
(45) Date of Patent: Mar. 12, 2019

(54) HEARING AID ADJUSTMENT VIA MOBILE DEVICE

(71) Applicant: ARM Ltd., Cambridge (GB)

(72) Inventors: Sang-Hun Kang, San Jose, CA (US); Stephan Diestelhorst, Cambridge (GB)

(73) Assignee: ARM Ltd., Cambridge (GB)

( * ) Notice: Subject to any disclaimer, the term of this patent is extended or adjusted under 35 U.S.C. 154(b) by 9 days.

(21) Appl. No.: 15/296,994

(22) Filed: Oct. 18, 2016

(65) Prior Publication Data

US 2018/0109889 A1 Apr. 19, 2018

(51) Int. Cl.

| H04R 25/00 | (2006.01) |
|---|---|
| G06F 3/16 | (2006.01) |
| G10L 17/00 | (2013.01) |
| G10L 25/78 | (2013.01) |
| H04M 1/02 | (2006.01) |
| G10L 21/06 | (2013.01) |

(52) U.S. Cl.
CPC ............ H04R 25/558 (2013.01); G06F 3/162 (2013.01); G10L 17/00 (2013.01); H04R 25/505 (2013.01); G10L 25/78 (2013.01); G10L 2021/065 (2013.01); H04M 1/0202 (2013.01); H04R 25/554 (2013.01); H04R 2225/43 (2013.01); H04R 2225/55 (2013.01)

(58) Field of Classification Search
CPC ................ H04R 25/554; H04R 25/558; H04R 2225/43; H04R 2225/55; G10L 17/00; G10L 25/78

See application file for complete search history.

(56) References Cited

U.S. PATENT DOCUMENTS

| 4,622,440 A | * | 11/1986 | Slavin | ................. | H04R 25/407 |
|---|---|---|---|---|---|
| | | | | | 381/313 |
| 6,912,289 B2 | * | 6/2005 | Vonlanthen | ............ | H04R 25/43 |
| | | | | | 381/312 |
| 8,194,900 B2 | * | 6/2012 | Fischer | ................ | H04R 25/407 |
| | | | | | 381/313 |
| 9,424,843 B2 | * | 8/2016 | Recker | .................... | G10L 15/26 |
| 9,837,079 B2 | * | 12/2017 | Warford | .................. | G10L 17/02 |
| 2008/0008341 A1 | * | 1/2008 | Edwards | .............. | H04R 25/552 |
| | | | | | 381/315 |
| 2008/0112598 A1 | * | 5/2008 | Gabara | ................... | G10L 17/00 |
| | | | | | 382/116 |

(Continued)

FOREIGN PATENT DOCUMENTS

| EP | 2528356 A1 | 11/2012 |
|---|---|---|
| EP | 2876899 A1 | 5/2015 |

OTHER PUBLICATIONS

Invitation to Pay Additional Fees and, where applicable, Protest Fee, dated Dec. 7, 2017, International Application No. PCT/GB2017/053146, 13pgs.

(Continued)

Primary Examiner — Joshua Kaufman
(74) Attorney, Agent, or Firm — Berkeley Law & Technology Group, LLP

(57) ABSTRACT

Subject matter disclosed herein may relate to hearing aids, and may relate more particularly to adjusting one or more parameters for one or more hearing aids based, at least in part, on one or more digital audio parameters converted from an electrical audio signal or on one or more characteristics of a particular environment, or a combination thereof.

20 Claims, 8 Drawing Sheets

(56) References Cited

U.S. PATENT DOCUMENTS

| | | | | |
|---|---|---|---|---|
| 2011/0237295 A1* | 9/2011 | Bartkowiak | ......... | H04R 25/505 455/556.1 |
| 2013/0034234 A1* | 2/2013 | Chen | ................ | H04M 1/72591 381/58 |
| 2013/0142365 A1* | 6/2013 | Lord | ................ | H04M 3/42391 381/312 |
| 2013/0144603 A1* | 6/2013 | Lord | ................... | H04L 12/1831 704/9 |
| 2013/0144619 A1* | 6/2013 | Lord | ...................... | G06F 3/165 704/235 |
| 2013/0144623 A1* | 6/2013 | Lord | ................... | G09B 21/006 704/249 |
| 2013/0223621 A1* | 8/2013 | Weidner | ............... | H04R 25/453 379/428.02 |
| 2014/0321682 A1* | 10/2014 | Kofod-Hansen | .... | H04R 25/305 381/315 |
| 2016/0162254 A1 | 6/2016 | Benattar | | |
| 2018/0109889 A1* | 4/2018 | Kang | ...................... | G06F 3/162 |

OTHER PUBLICATIONS

PCT/GB2017/053146 / 252.P042PCT: Partial Search Report, dated Dec. 7, 2017, 13 pages.
PCT/GB2017/053146 / 252.P042PCT: International Search Report and Written Opinion, dated Jan. 31, 2018, 20 pages.

\* cited by examiner

HEARING AID ADJUSTMENT VIA MOBILE DEVICE

BACKGROUND

Field

Subject matter disclosed herein may relate to hearing aids, and may relate more particularly to adjusting one or more parameters for one or more hearing aids based, at least in part, on one or more audio interactions between a user and one or more second parties detected by a mobile device.

Information

Integrated circuit devices, such as processor, for example, may be found in a wide range of electronic device types. For example, one or more processors may be used in hearing aids, for example, as well as in computers, digital cameras, cellular telephones, tablet devices, personal digital assistants, wearable devices, etc. In a hearing aid, for example, integrated circuit devices, such as processors, for example, may be utilized to process one or more signals and/or states in a manner so as to enhance audibility or intelligibility of an audio signal.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
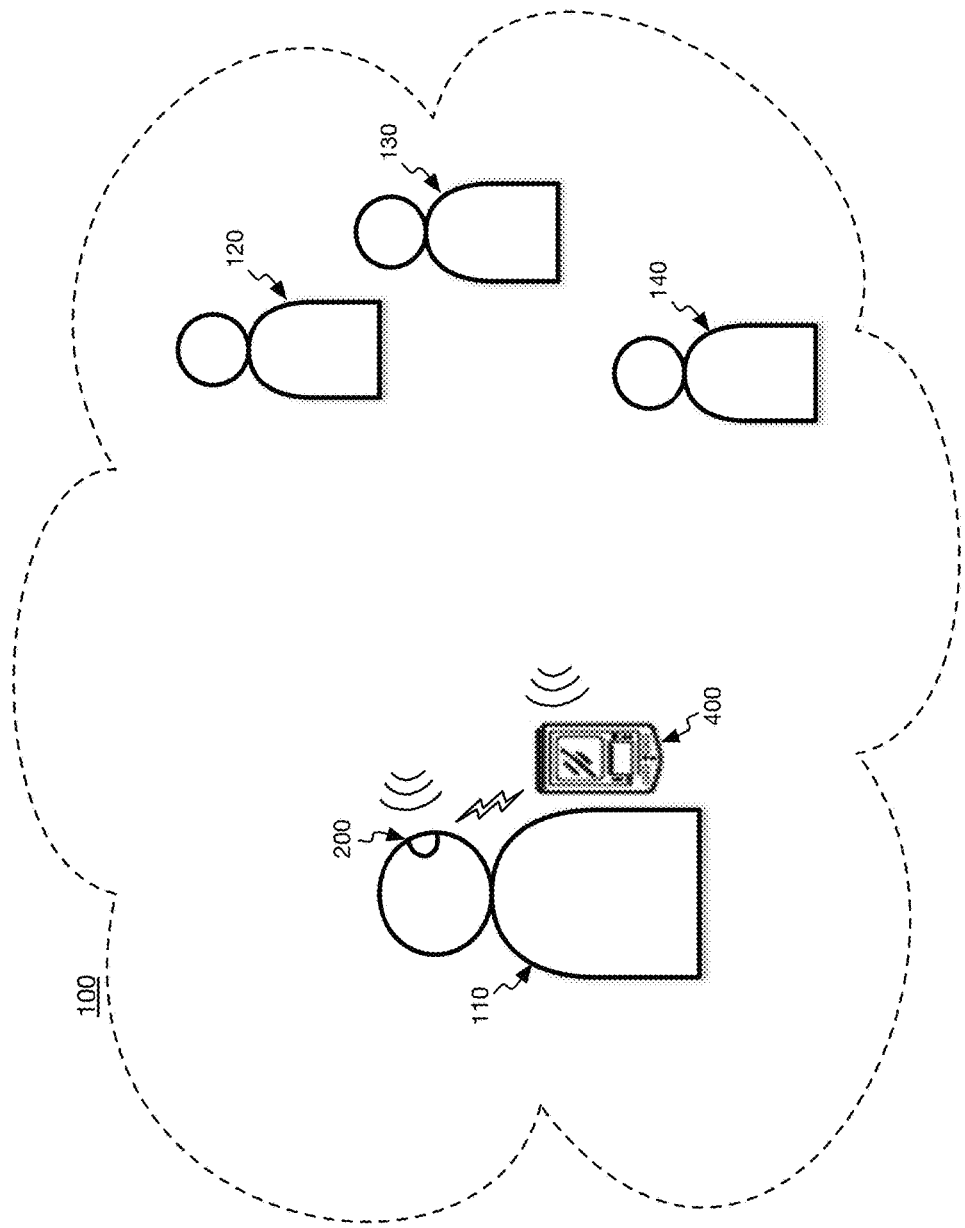
FIG. 1 is an illustration of an embodiment of an example hearing aid and an example mobile device in an example environment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

As mentioned, integrated circuit devices, such as processors, for example, may be found in a wide range of electronic device types. For example, one or more processors may be used in hearing aids, for example, as well as in computers, digital cameras, cellular telephones, tablet devices, personal digital assistants, wearable devices, etc. In a hearing aid, for example, integrated circuit devices, such as processors, for example, may be utilized to process one or more signals and/or states in a manner so as to enhance audibility or intelligibility, or a combination thereof, of an audio signal. As utilized herein, the term "hearing aid" and the like refers to an audio device, such as wearable by a user or implantable into a user, or a combination thereof, for example, intended to improve the user's hearing.

For example, in an embodiment, a mobile device may detect an audio interaction between a user, such as a hearing aid user, and one or more second parties. One or more parameters for one or more hearing aids may be adjusted to enhance audibility and/or intelligibility, or a combination thereof, of an audio signal based, at least in part, on an identity of at least one of the one or more second parties. For example, a mobile device may use voiceprint content to identify one or more particular individuals among one or more second parties. Further, for example, one or more parameters based at least in part on identities of the one or more particular identified second parties or based at least in part on voiceprint content for the one or more identified second parties, or a combination thereof, may be communicated between a mobile device and one or more hearings aids, in an embodiment. In an additional embodiment, voiceprint content associated with one or more identified second parties may be communicated between a mobile device and one or more hearings aids, and/or may be utilized, at least in part, by one or more hearing aids, for example, to enhance audibility and/or intelligibility of an audio signal. Of course, claimed subject matter is not limited in scope to the particular examples discussed herein.

FIG. 1 is an illustration of an embodiment 200 of an example hearing aid and an embodiment 400 of an example mobile device in an example environment, such as environment 100. In an embodiment, environment 100 may comprise an indoor environment, such as a room, hallway, office, stairwell, restaurant, arena, auditorium, etc. Of course, these are merely example types of indoor environments, and claimed subject matter is not limited in scope in this respect. Further, in an embodiment, environment 100 may comprise an outdoor environment, such as, for example and not by way of limitation, a courtyard, park, walkway, ballpark, sidewalk, parking lot, etc. In some environments, such as environment 100, a user, such as hearing aid user 110, may have difficulty hearing and/or discerning speech from one or more individuals with whom the user wishes to speak. For example, environment 100 may comprise a noisy restaurant, and a user, such as hearing aid user 110, may wish to better communicate with one or more particular individuals, such as one or more of second parties 120, 130, or 140, or a combination thereof. As used herein, the term "second party" and/or the like refers to a person other than a particular user. For example, individuals 120, 130, or 140, or a combination thereof, may comprise one or more second parties as related to a user, such as hearing aid user 110. Of course, although only three second parties are depicted as located in environment 100 in FIG. 1, the scope of claimed subject matter is not limited in these respects.

In an embodiment, a mobile device, such as mobile device 400, associated with a user, such as hearing aid user 110, may have stored thereon one or more records, such as one or more contacts of one or more contact lists, for example, including, but not limited to, names, phone numbers, or email addresses, or a combination thereof, for one or more contacts. In an embodiment, one or more records, such as one or more contacts of one or more contact lists, for example, may also include voiceprint content, such as one or more voiceprints for one or more contacts, for example. Also in an embodiment, one or more voiceprints may be utilized directly or indirectly, or a combination thereof, to enhance audibility or intelligibility, or a combination thereof, of an audio signal. For example, voiceprint content or one or more parameters derived from voiceprint content, or a combination thereof, for one or more particular identified speaking individuals may be utilized, at least in part, by one or more hearing aids, such as hearing aid 200, to adjust one or more signal processing parameters to enhance audibility or intelligibility, or a combination thereof, of an audio signal. In an embodiment, an audio signal generated at least in part via one or more hearing aid microphones, for example, may be enhanced by one or more processors of one or more hearing aids, such as hearing aid 200, and a resulting audio signal may be communicated to a hearing aid user, such as user 110, via a hearing aid output transducer, as discussed more fully below.

In an embodiment, voiceprint content may be utilized at least in part to identify one or more particular individuals by matching audio content gathered at least in part via a microphone, such as a microphone on a mobile device, with voiceprint content stored on the mobile device. Further, in an embodiment, wireless communication between a mobile device, such as mobile device 400, and one or more hearing aids, such as hearing aid 200, may provide the one or more hearing aids with one or more identities of one or more particular individuals, such as one or more of second parties 120, 130, or 140 or a combination thereof, and/or may provide the one or more hearing aids, such as hearing aid 200, with one or more parameters, such as one or more signal processing parameters, based at least in part on the one or more identities of the one or more particular individuals. In an embodiment, one or more hearing aids, such as hearing aid 200, may adjust one or more signal processing parameters or one or more configuration parameters, or a combination thereof, to enhance audibility or intelligibility, or a combination thereof, of an audio signal based at least in part on identities of one or more particular individuals or on voiceprint content for the one or more identified particular individuals, or a combination thereof, for example.

As utilized herein, the term "voiceprint" refers to digital content derived at least in part from audio content captured at a computing device, such as a mobile device, for example, that identifies a particular individual. In an embodiment, a voiceprint may comprise digital content, such as one or more parameters representative of one or more respective measurable characteristics of a human voice, for example, that identifies an individual. In an embodiment, one or more parameters derived from a voiceprint, or from at least a portion of a voiceprint, or a combination thereof, may be communicated between a mobile device, such as mobile device 400, and one or more hearing aids, such as hearing aid 200, for example. In an embodiment, communication between a mobile device, such as mobile device 400, and one or more hearing aids, such as hearing aid 200, may comprise communication via a wireless interconnect, for example.

As described herein, various example embodiments may include signal processing to enhance audibility or intelligibility, or a combination thereof, of an audio signal, such as an audio signal to be communicated to a user, such as a hearing aid user, via one or more hearing aid output transducers. In one or more embodiments, signal processing may occur at one or more hearing aid devices or at one or more mobile devices, or a combination thereof. Similarly, voiceprint analysis, such as to compare a sampled audio signal with voiceprint content to identify one or more particular second parties, may be performed at one or more mobile devices or one or more hearing aid devices, or a combination thereof.

Figure 2:
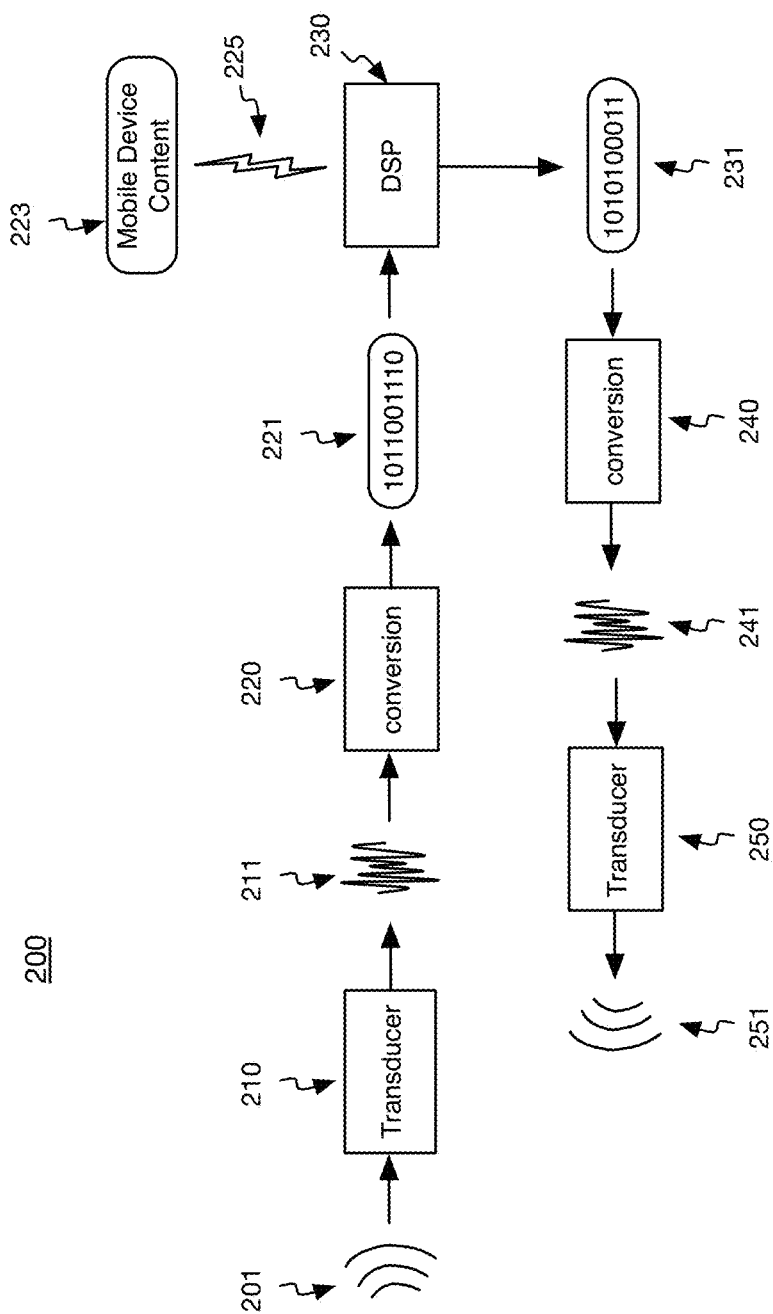
FIG. 2 is a schematic block diagram depicting example operations that may be performed by an example hearing aid and/or mobile device, in accordance with an embodiment.

FIG. 2 is a schematic block diagram depicting example operations that may be performed by an example hearing aid, such as hearing aid 200, and/or mobile device, such as mobile device 400, to enhance audibility or intelligibility, or a combination thereof, of an audio signal in accordance with an embodiment. For example, it may be advantageous to a hearing aid user, such as hearing aid user 110, to enhance sound that reaches a hearing aid, such as hearing aid 200, to allow a hearing aid user, such as hearing aid user 210, to more completely discern and/or comprehend, for example, the sound reaching the hearing aid. For example, a user, such as user 110, may wish to better discern and/or comprehend words being spoken by one or more second parties, wherein the user and the one or more second parties may be located in a noisy environment.

In an embodiment, one or more sound waves, such as sound wave 201, may arrive at a hearing aid, such as hearing aid 200. Further, in an embodiment, a sound wave, such as sound wave 201, may be converted into an analog electrical signal, such as analog audio signal 211, via an acoustical energy-to-electrical signal transducer, such as transducer 210. In an embodiment, a transducer, such as transducer 210, may comprise one or more microphones of one or more hearing aids, for example. Also, in an embodiment, sound wave 201 may comprise a combination of sounds from any number of sources, such as, for example, sound waves emanating from one or more second parties or from one or more environmental sources, or a combination thereof, although claimed subject matter is not limited in scope in these respects. Further, in an embodiment, an analog electrical signal, such as analog audio signal 211, may be converted to one or more digital signals and/or states, such as digital audio signals and/or states 221, by way of a conversion operation as depicted at block 220 of FIG. 2, for example.

At block 230 of FIG. 2, for example, one or more digital signal processing operations may be performed on one or more digital signals and/or states, such as digital audio signals and/or states 221, to enhance audibility or intelligibility, or a combination thereof, for example, of an audio signal, as discussed more fully below. In an embodiment, digital signal processing, such as depicted at block 230, for example, may generate one or more digital signals and/states, such as digital audio signals and/or states 231, based, at least in part, on digital audio signals and/or states 221 and based, at least in part, on content, such as digital content 223, communicated between one or more mobile devices, such mobile device 400, and one or more hearing aids, such as hearing aid 200. In an embodiment, digital content, such as digital content 223, may be communicated via a wireless interconnect, such as wireless interconnect 225, for example. In an embodiment, types of digital content, such as digital content 223, that may be communicated between one or more mobile devices and one or more hearing aids may include, by way of example and not limitation, voiceprint content, one or more hearing aid configuration parameters, one or more digital signal processing parameters, distance or direction, or a combination thereof, of one or more second parties from a mobile device, one or more parameters descriptive of an environment, such as environment 100, identities of one or more second parties, one or more parameters descriptive of one or more characteristics of one or more second parties, digital audio content comprising background and/or environmental noise, one or more equalization parameters, one or more parameters obtained from a user, such as hearing aid user 110, via a graphical user interface of a mobile device, etc. Also, in an embodiment, example types of digital signal processing that may be performed by one or more processors, such as one or more processors of one or more mobile devices or one or more processors of one or more hearings aids, or a combination thereof, may include, but are not limited to, noise reduction, audio frequency equalization, low-pass and/or high pass filtering, volume adjustments, or summing of more than two digital audio signals, or a combination thereof.

As mentioned, digital signal processing, such as depicted at block 230, for example, may generate one or more digital signals and/states, such as digital audio signals and/or states 231, based, at least in part, on digital audio signals and/or states 221 and based, at least in part, on content, such as digital content 223, communicated between one or more mobile devices, such mobile device 400, and one or more hearing aids, such as hearing aid 200, for example. In an embodiment, digital audio signals and/or states 231 may be referred to as "enhanced" digital audio signals and/or states in that digital audio signals and/or states 231 may comprise digital content, such as digital audio signals and/or states 221, having undergone digital signal processing as depicted, for example, at block 230. In an embodiment, digital audio signals and/or states 221 may be processed based, at least in part, on digital content, such as digital content 223, communicated between one or more mobile devices and one or more hearing aids to enhance audibility or intelligibility, or a combination thereof, of an audio signal.

In an embodiment, a digital-to-analog conversion operation, depicted in FIG. 2 at block 240, may generate an enhanced analog audio signal, such as enhanced analog audio signal 241, based at least in part on enhanced digital audio signals and/or states, such as digital audio signals and/or states 231, for example. Additionally, one or more transducers, such as one or more output transducers 250, may generate one or more sound waves, such as one or more sound waves 251, based at least in part on an enhanced analog audio signal, such as enhanced analog audio signal 241, in an embodiment. Further, in an embodiment, one or more transducers, such as one or more output transducers 250, may comprise one or more output drivers to convert electrical energy into sound waves.

In an embodiment, output sound waves 251 may comprise an enhanced representation of input sound waves 201. For example, for a situation in which sound waves 201 comprise sound waves generated by one or more second parties speaking in a noisy indoor environment, sound waves 251 may exhibit reduced background noise and/or may exhibit enhanced audibility and/or intelligibility for speech emanating from the one or more second parties. As mentioned, digital signal processing operations may be performed based at least in part on digital content communicated between one or more mobile devices and one or more hearing aids to accomplish enhancement of an audio signal, in an embodiment.

As utilized herein, the term "audio signal" refers to one or more analog and/or digital signals and/or states representative of one or more sound waves. Example audio signals depicted in FIG. 2 may include analog audio signal 211, digital audio signals and/or states 221, enhanced digital audio signals and/or states 231, and/or analog audio signal 241. For example, analog audio signal 211 may be representative of one or more sound waves 201, in an embodiment. Digital audio signals and/or states 221 may also be representative of one or more sound waves 201. Similarly, enhanced digital audio signals and/or states 231 and/or enhanced analog audio signal 241 may be representative of enhanced sound wave 251, for example.

Figure 3:
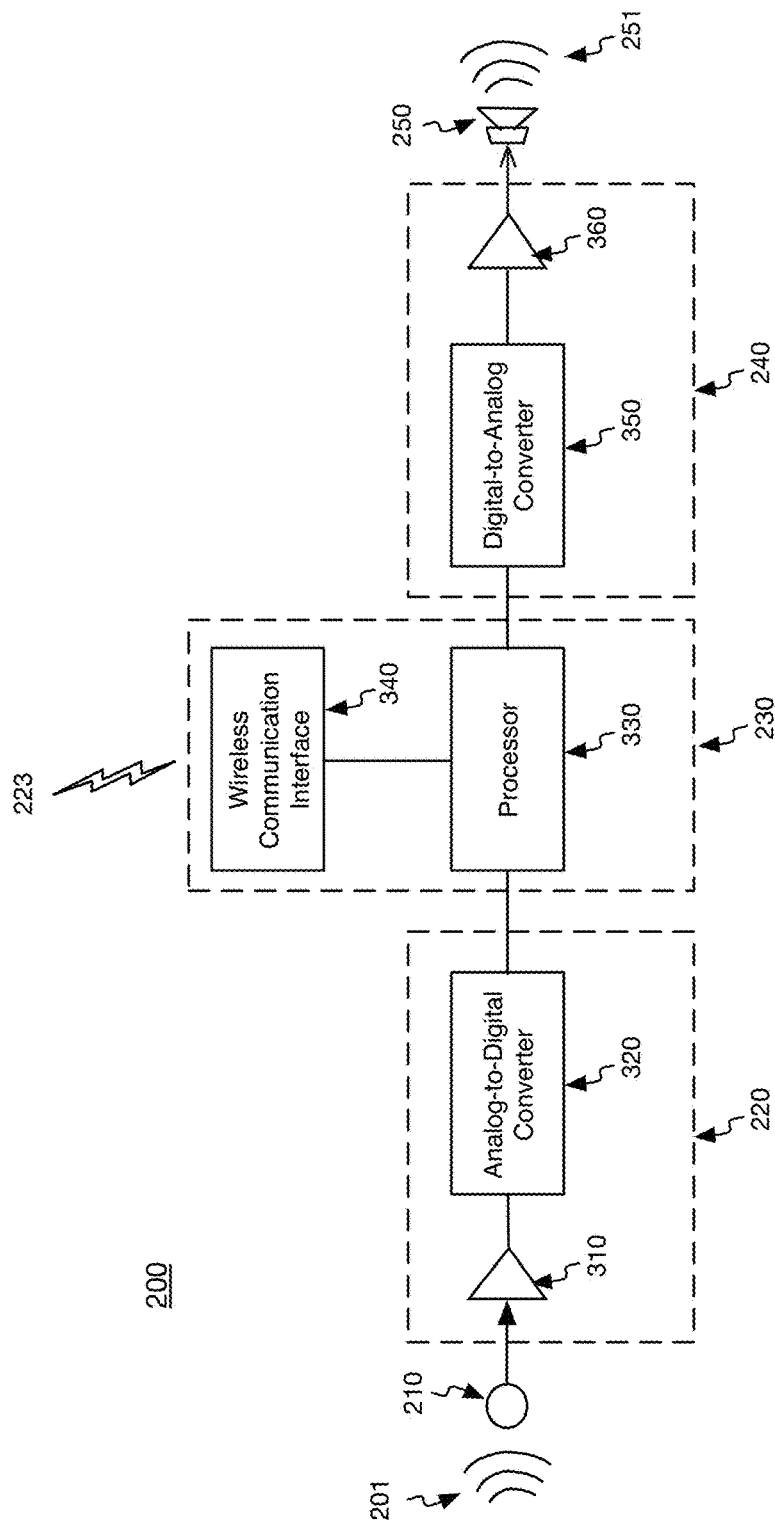
FIG. 3 is a schematic block diagram of an embodiment of an example hearing aid.

FIG. 3 is a schematic block diagram of an embodiment 200 of an example hearing aid, including, for example, one or more processors, such as processor 330, and one or more wireless communication interfaces, such as wireless communication interface 340. In an embodiment, one or more processors, such as 330, and/or one or more wireless communication interfaces, such as 340, may perform, at least in part, digital signal processing operations, such as depicted at block 230 of FIG. 2. For example, a processor, such as processor 330, may perform one or more digital signal processing operations to enhance audibility or intelligibility, or a combination thereof, of an audio signal.

Also, in an embodiment, an example hearing aid, such as hearing aid 200, may comprise one or more transducers, such as microphone 210, analog front end circuitry, such as analog front end 310, and an analog-to-digital converter, such as analog-to-digital converter 320, for example. An analog front end, such as analog front end 310, for example, may filter and/or otherwise condition an audio signal in preparation for an analog-to-digital conversion process, such as may be performed by an analog-to-digital converter, such as analog-to-digital converter 320, for example. In an embodiment, analog front end circuitry, such as 310, and/or an analog-to-digital converter, such as 320, may perform conversion operations such as depicted at block 220 in FIG. 2.

Further, in an embodiment, an example hearing aid, such as hearing aid 200, for example, may include a digital-to-analog converter, such as digital-to-analog converter 350, analog back-end circuitry, such as analog back-end 360, and one or more output transducers, such as output transducer 250. In an embodiment, a digital-to-analog converter, such as 350, and/or analog back-end circuitry, such as 360, may perform digital-to-analog conversion operations, such as depicted at block 240 of FIG. 2. Of course, claimed subject matter is not limited in scope to the specific examples described herein. Embodiments in accordance with claimed subject matter may include fewer components and/or elements than those depicted in FIG. 3, all of the components and/or elements depicted in FIG. 3, or more than the components and/or elements depicted in FIG. 3. Further, the configuration of components and/or elements depicted in FIG. 3 is merely an example configuration, and claimed subject matter is not limited in scope in these respects.

Figure 4:
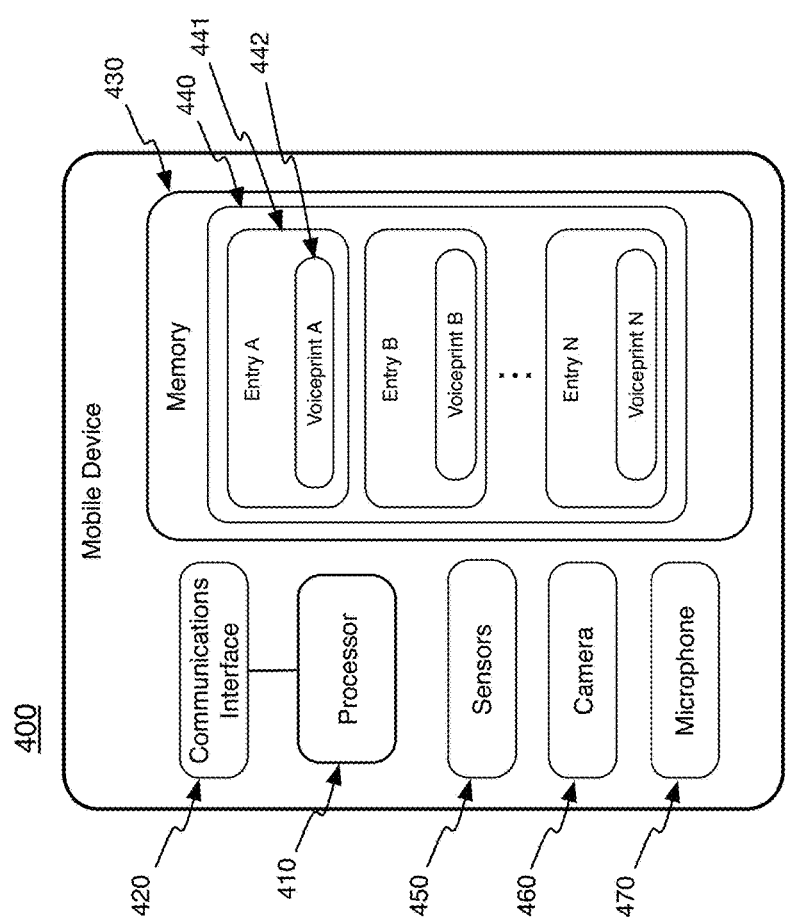
FIG. 4 is a schematic block diagram of an embodiment of an example mobile device.

FIG. 4 is a schematic block diagram of an embodiment 400 of an example mobile device, such as depicted, for example, in FIG. 1. In an embodiment, a mobile device, such as 400, may comprise one or more processors, such as processor 410, and/or may comprise one or more communications interfaces, such as communications interface 420. In an embodiment, one or more communications interfaces, such as communications interface 420, may enable wireless communications between a mobile device, such as mobile device 400, and one or more other computing devices, including for example, one or more hearing aids, such as hearing aid 200. In an embodiment, wireless communications may occur in accordance with a Bluetooth protocol, such as Bluetooth Core Specification 4.2, published by Bluetooth SIG in December, 2014, although claimed subject matter is not limited in scope in this respect. Other example wireless communication protocols, standards, and/or conventions in accordance with claimed subject matter are mentioned below, although, again, claimed subject matter is not limited in scope to the specific examples provided herein.

In an embodiment, a mobile device, such as mobile device 400, may include a memory, such as memory 430. In an embodiment, memory 430 may comprise a non-volatile memory, for example. Further, in an embodiment, a memory, such as memory 430, may have stored therein a contact list, such as contact list 440, for example. In an embodiment, a contact list, such as 440, may comprise one or more entries, such as entries 441. For the example depicted in FIG. 4, entries A through N are shown, although claimed subject matter is not restricted to any particular size of contact list or amount of contact list entries. In an embodiment, individual entries of a contact list, such as contact list 440, may include content associated with specified contacts. For example, one or more entries of a contact list, such as contact list 440, may include one or more phone numbers, one or more email addresses, one or more names, one or more images, and/or one or more birthdays, to name but a few example content types that may be stored in a contact list.

Also, in an embodiment, a contact list, such as contact list 440, may have stored therein voiceprint content associated with one or more individuals. As mentioned, a voiceprint comprises digital content that may be derived at least in part from voice content captured and/or stored at a computing device, such as a mobile device, for example. In an embodiment, a voiceprint may identify, at least in part, a particular individual. For example, a voiceprint may comprise digital content, such as one or more parameters representative of one or more respective measurable characteristics of a human voice, for example, that may identify an individual. In an embodiment, a voiceprint may be derived from audio content gathered from one or more phone conversations, one or more voicemail recordings, or one or more video conferencing sessions, or a combination thereof, involving a particular individual, for example. Further, in an embodiment, a microphone, such as microphone 470 of mobile device 400, may be utilized at least in part to capture audio content from a particular user, for example, and such audio content may be utilized to generate a voiceprint associated with the particular user. In an embodiment, voiceprint content for a particular individual may be derived from multiple instances of audio content capture to improve quality or accuracy, or a combination thereof, of the voiceprint. Of course, these are merely examples of how audio content for a particular user may be utilized to generate voiceprint content associated with the particular user, and claimed subject matter is not limited in scope in these respects.

In an embodiment, a mobile device, such as mobile device 400, may further comprise one or more sensors, such as one or more sensors 450, and/or one or more cameras, such as one or more cameras 460, for example. In an embodiment, one or more sensors, such as 450, may comprise one or more accelerometers, gyroscopes, thermometers, magnetometers, barometers, light sensors, or proximity sensors, or a combination thereof. Of course, these are merely example types of sensors that may be included in a mobile device, and claimed subject matter is not limited in scope to these particular examples.

As discussed above, digital content, such as digital content 223, from a mobile device, such as mobile device 400, may be utilized, at least in part, to enhance audibility or intelligibility, or a combination thereof, of an audio signal at a hearing aid device, such as hearing aid 200. For example, as described above, voiceprint content may be utilized at least in part to identify one or more particular second parties in an environment. Further, one or more signal processing parameters may be determined and/or adjusted, for example, based at least in part on identities of one or more particular individuals. Voiceprint content may be utilized, at least in part, to separate speaking from a particular individual from environmental noise, for example, to enhance audibility and/or intelligibility of the speaking voice of the particular individual, in an embodiment. As also mentioned previously, digital signal processing operations may be performed at one or more mobile devices or at one or more hearings aids, or a combination thereof.

In a further embodiment, digital content, such as digital content 223, from a mobile device, such as mobile device 400, may comprise digital content derived from one or more sensors, such as sensors 450, or one or more cameras, such as cameras 460, of a mobile device, such as mobile device 400. In an embodiment, digital content obtained from one or more sensors, such as 450, and/or one or more cameras, such as 460, may be utilized, at least in part, to enhance audibility and/or intelligibility of an audio signal. For example, digital content from a camera, such as camera 460, may be utilized, at least in part, by a processor, such as processor 410, to determine, at least in part, a distance and/or direction of a particular second party. Further, digital content comprising distance and/or direction parameters associated with one or more particular second parties may be utilized by one or more processors, such as processor 410 of mobile device 400 or processor 350 of hearing aid 200, or a combination thereof, to enhance audibility and/or intelligibility of an audio signal at a hearing aid, such as hearing aid 200.

Also, in an embodiment, one or more cameras, such as cameras 460, or one or more sensors, such as sensors 450, or a combination thereof, may be utilized at least in part to determine one or more characteristics of an environment, such as environment 100, or one or more characteristics of one or more second parties, such as second parties 120, 130, and/or 140, or a combination thereof. For example, one or more cameras and/or one or more sensors may be utilized, at least in part, to determine whether an environment, such as 100, may comprise an indoor environment or outdoor environment, or to determine an amount of second parties within a specified proximity, or to determine gender and/or approximate age of one or more second parties, or a combination thereof. Of course, these are merely example characteristics of an environment and/or of one or more second parties that may be determined, at least in part, utilizing one or more cameras, such as camera 460, and/or one or more sensors, such as sensors 450.

Figure 5:
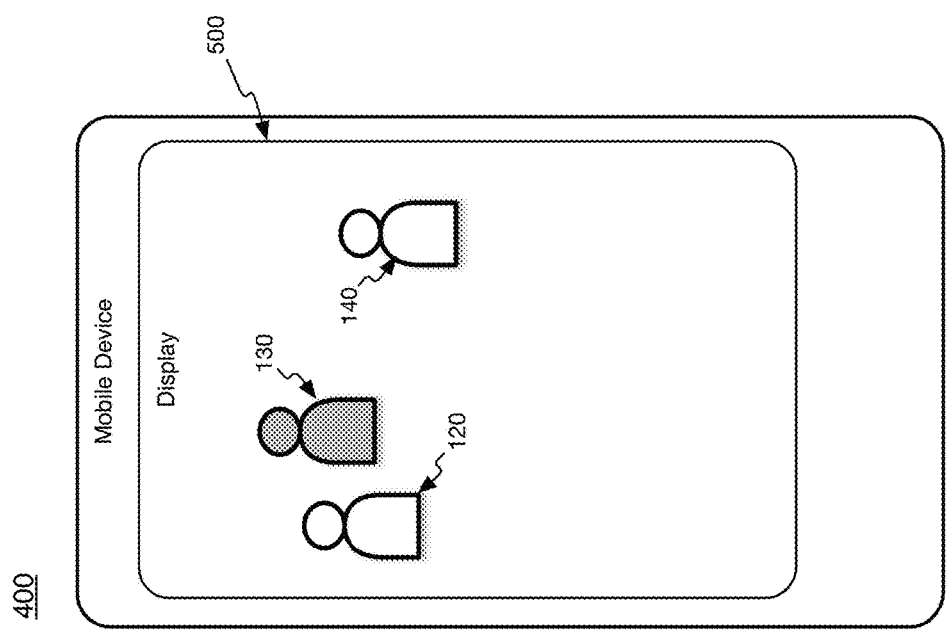
FIG. 5 is an illustration depicting an example mobile device graphical user interface, in accordance with an embodiment.

FIG. 5 is an illustration depicting an example mobile device, such as mobile device 400, including an example graphical user interface (GUI), such as GUI 500, in accordance with an embodiment. In an embodiment, a mobile device, such as mobile device 400, may provide a GUI that may allow a user, such as hearing aid user 200, to view a visual approximation of one or more second parties, such as second parties 120, 130, and/or 240. In an embodiment, one or more cameras, such as camera 460, and/or one or more sensors, such as sensor 450, may generate one or more signals and/or states representative of one or more characteristics of an environment, such as environment 100, and/or one or more characteristics of one or more second parties, such as second parties 120, 130, and/or 140, for example. In an embodiment, one or more processors, such as processor 410, may generate digital content representative of an environment, such as environment 100, and/or may generate digital content representative of one or more second parties, such as second parties 120, 130, and/or 140, to be presented to a user, such as hearing aid user 200, via a GUI, such as GUI 500. In an embodiment, GUI 500 may comprise a touchscreen, although claimed subject matter is not limited in scope in these respects.

In an embodiment, a GUI, such as GUI 500, may allow a user, such as hearing aid user 110, to indicate, via touch selection, for example, of one or more second parties, such as one or more of second parties 120, 130, and/or 140, which one or more of the one or more second parties with whom the user desires to more readily converse. For example, as depicted in the example of FIG. 5, a user, such as hearing aid user 110, may select second party 130. In an embodiment, at least in part in response to user selection of one or more second parties, such as second party 130, digital content, such as digital content 223, may be communicated between one or more mobile devices, such as mobile device 400, and one or more hearing aids, such as hearing aid 200. In an embodiment, digital content, such as digital content 223, communicated between one or more mobile devices, such as mobile device 400, and one or more hearing aids, such as hearing aid 200, may comprise one or more parameters associated with identities of one or more selected second parties, such as second party 130, for example. In an embodiment, one or more mobile devices, such as mobile device 400, or one or more hearing aids, such as hearing aid 200, or a combination thereof, may enhance audibility or intelligibility, or a combination thereof, of an audio signal utilizing, at least in part, the parameters associated with the identities of the one or more selected second parties, such as second party 130, for example. In an embodiment, parameters associated with identities of one or more selected second parties may include, for example, voiceprint content associated with the one or more selected second parties, identities of the one or more selected second parties, or one or more digital signal processing parameters selected at least in part in accordance with the selected one or more second parties, or a combination thereof, for example.

Figure 6:
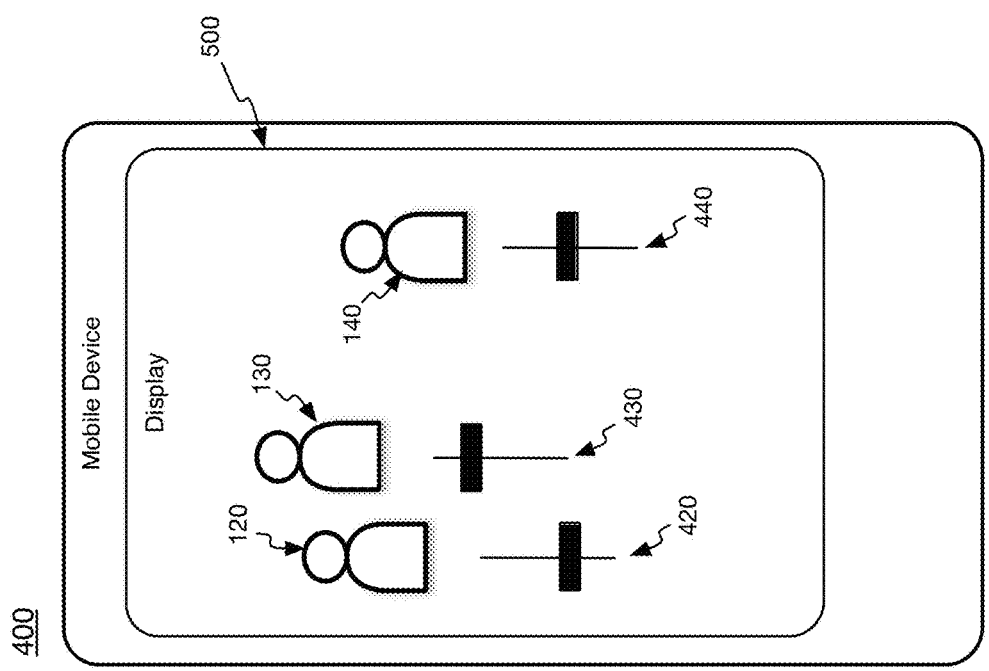
FIG. 6 is an illustration depicting an example mobile device graphical user interface, in accordance with an embodiment.

FIG. 6 is an illustration depicting an example mobile device, such as mobile device 400, including an additional example graphical user interface (GUI), such as GUI 500, in accordance with an embodiment. As with the example discussed above in connection with FIG. 5, a GUI, such as GUI 500, may allow a user, such as hearing aid user 110, to indicate via touch selection of one or more second parties, such as one or more of second parties 120, 130, and/or 140, which of the one or more second parties with whom the user desires to more readily converse. In addition to allowing a user, such as hearing aid user 110, to select one or more second parties, a GUI, such as GUI 500, may also display volume sliders, such as depicted at 410, 430, and 440, for individual second parties, in an embodiment. For example, a user, such as hearing aid user 110, may desire to better hear second party 130. A user, such as hearing aid user 110, may adjust a volume slider, such as volume slider 430, to better hear speech from second party 130, in an embodiment.

In an embodiment, a mobile device, such as 400, may generate and/or adjust one or more parameters that may be communicated between one or more mobile devices, such as mobile device 400, and one or more hearing aids, such as hearing aid 200, at least in part in response to user manipulation of one or more volume sliders. Example types of parameters that may be communicated between one or more mobile devices, such as mobile device 400, and one or more hearing aids, such as hearing aid 200, in response to user manipulation of one or more volume sliders includes, for example, voiceprint content associated with the one or more second parties, identities of one or more second parties, or one or more digital signal processing parameters, or a combination thereof, in an embodiment.

Although FIG. 5 and FIG. 6 depict example GUI elements, claimed subject matter is not limited in scope to these specific examples. For example, in an embodiment, a GUI, such as GUI 500, may provide a user, such as hearing aid user 110, with the ability to specify a preference with respect to signal processing algorithms for various second parties and/or environments and/or to specify different types of background noise to be filtered, to name but a few examples. Also, in an embodiment, one or more cameras, such as camera 460, may be utilized, at least in part, to generate a visual display, such as on a mobile device, that may allow a user, such as hearing aid user 110, to select one or more second parties with whom the user may wish to more clearly communicate, such as in a manner described above, for example. Also, in an embodiment, wearable computing devices and/or other types of computing devices may be utilized in conjunction with example embodiments described herein, and/or in accordance with claimed subject matter.

Further, in an embodiment, a microphone, such as microphone 470 of example mobile device 400, may be utilized in approximately real-time to gather samples of audio, such as samples of environmental background audio, to be utilized at least in part by one or more mobile devices, such as mobile device 400, and/or by one or more hearing aid devices, such as hearing aid device 200, to actively reduce background noise from a hearing aid audio signal, for example.

Additionally, in an embodiment, a GUI, such as GUI 500, may be utilized to alert a user, such as hearing aid user 110, of detected emergency situations. For example, a mobile device, such as mobile device 400, may detect particular types of audio, such as shouting and/or screaming words and/or phrases indicating emergency situations, such as "help," "fire," etc. A mobile device, such as 400, may also detect alarms and/or sirens, for example. In an embodiment, at least in part in response to detecting one or more audio signals indicating an emergency situation, a GUI, such as GUI 500, may display one or more alerts to a user, such as hearing aid user 110, for example. In an embodiment, an alert may comprise textual content or graphical content, or a combination thereof, displayed, for example, on a GUI, such as GUI 500. Further, in an embodiment, an alert may include vibrating a mobile device, such as mobile device 400, for example. One or more audio signals may also be generated at one or more hearing aids, such as hearing aid 200, and/or at a mobile device, such as mobile device 400, to alert a user of a detected emergency situation. Thus, in one or more embodiments, background noises may be suppressed to enhance intelligibility and/or audibility of one or more audio signals, for example, while maintaining an ability to alert a user of potential emergency situations.

Figure 7:
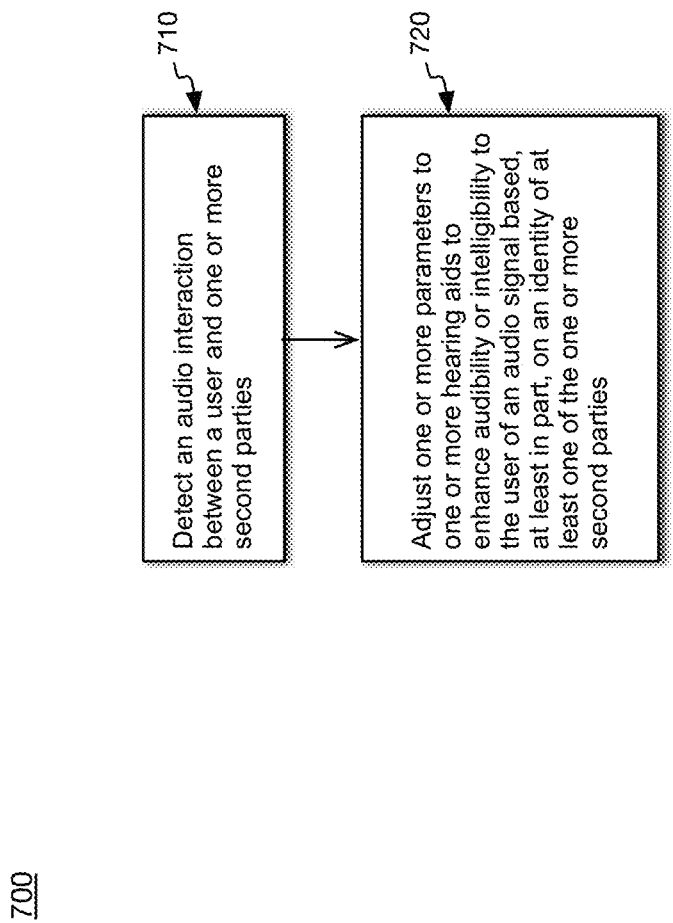
FIG. 7 is an illustration depicting an embodiment of an example process for enhancing audibility and/or intelligibility of an audio signal in an embodiment of an hearing aid.

FIG. 7 is an illustration depicting an embodiment 700 of an example process for enhancing audibility and/or intelligibility of an audio signal in an embodiment of an hearing aid. Although the example embodiment depicted in FIG. 7 includes blocks 710 and 720, other embodiments in accordance with claimed subject matter may include more than blocks 710 and 720, or may include fewer than blocks 710 and 720. Similarly, the order of blocks 710 and 720 is merely an example order, and claimed subject matter is not limited in scope in this respect.

As depicted at block 710, an audio interaction between a user and one or more second parties may be detected. Further, as depicted at block 720, one or more parameters to one or more hearing aids may be adjusted to enhance audibility or intelligibility, or a combination thereof, to the user of an audio signal based, at least in part, on an identity of at least one of the one or more second parties, in an embodiment.

In an embodiment, an example process for enhancing audibility and/or intelligibility of an audio signal may further include, for example, identifying at least one of one or more second parties at least in part by comparing one or more signals and/or states derived from audio interaction with voice print content stored in a memory of a mobile device. Also, in an embodiment, adjusting one or more parameters of one or more hearing aids may include communicating one or more signals and/or states comprising particular voice print content associated with an identified at least one of one or more second parties between a mobile device and one or more hearing aids. Additionally, in an embodiment, communicating one or more signals and/or states between a mobile device and one or more hearing aids may comprise communicating the one or more signals and/or states via a wireless type connection, as mentioned previously. Further, in an embodiment, voiceprint content may be stored in a mobile device as part of one or more contact lists, and one or more contact lists may further include one or more names, phone numbers, email addresses, or photographs, etc., or any combination thereof.

Also, in an embodiment, voiceprint content may be obtained, at least in part, via analysis of audio content captured during one or more real-time phone conversations or captured as one or more voice messages, or a combination thereof, in an embodiment. Further, adjusting one or more parameters of one or more hearing aids may further include communicating one or more signals and/or states comprising content obtained at least in part via one or more cameras, one or more microphones, or one or more sensors, or any combination thereof, between one or more mobile devices and the one or more hearing aids. Also, in an embodiment, content that may be obtained at least in part via the one or more cameras, microphones, or sensors, or any combination thereof, may comprise one or more parameters representative of an approximate distance between one or more identified and/or specified second parties and a user of one or more hearing aids, for example. Further, in an embodiment, content that may be obtained at least in part via the one or more cameras, microphones, or sensors, or any combination thereof, may include one or more parameters descriptive at least in part of an environment in which a user of one or more hearing aids may be located.

In one or more example embodiments herein, one or more mobile devices, such as 400, are described. However, claimed subject matter is not limited in scope to utilization of mobile devices in conjunction with one or more hearing aids. Rather, embodiments in accordance with claimed subject matter may utilize any computing device type. Example types of computing devices are mentioned below, and may include, for example, any of a wide range of digital electronic device types, including, but not limited to, desktop and/or notebook computers, high-definition televisions, game consoles, cellular telephones, tablet devices, wearable devices, hearing aids, personal digital assistants, mobile audio and/or video playback and/or recording devices, or any combination of the foregoing. Also, one or more computing devices may be networked with one or more other computing devices, and/or may also be networked with one or more hearing aids, for example, in accordance with claimed subject matter.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, hearing aids, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present disclosure, the terms "voice print," "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

Regarding aspects related to a network and/or sub-network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
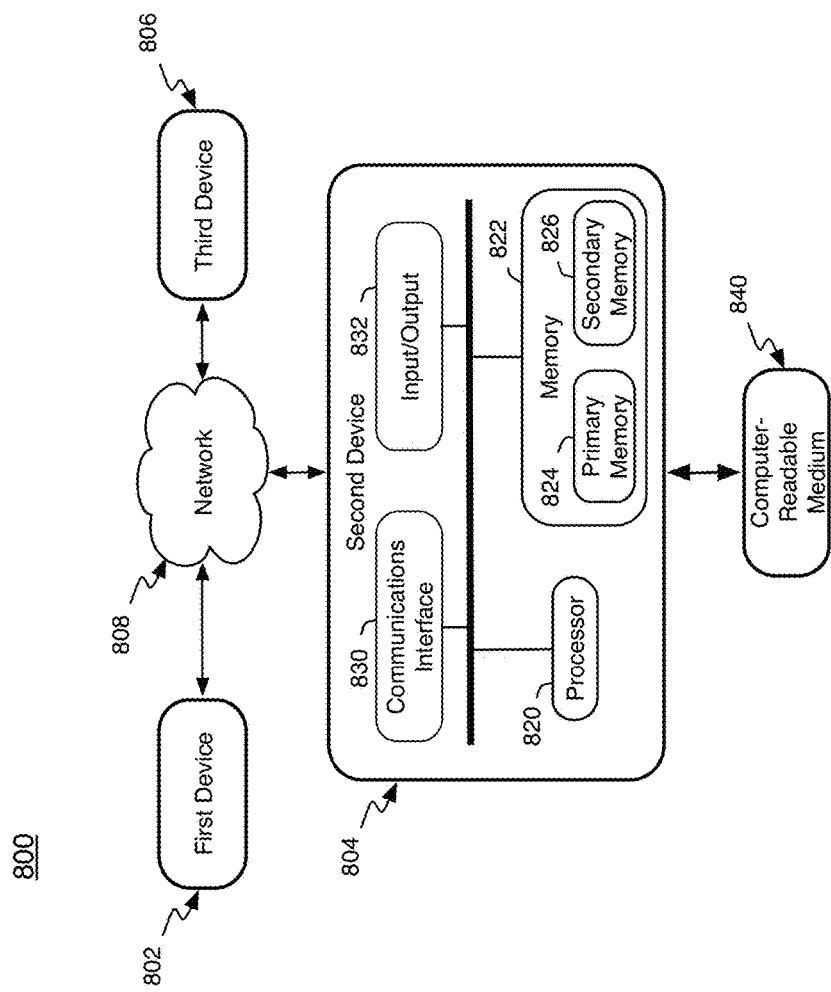
FIG. 8 is a schematic diagram depicting an embodiment of an example computing device.

In one example embodiment, as shown in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices, such as one or more mobile devices and/or one or more hearing aids, and/or one or more server computing devices. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, such as one or more mobile devices and/or one or more hearing aids described above in connection with FIGS. 1-7 of the present disclosure, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in the foregoing paragraphs associated with FIGS. 1-7 of the present disclosure.

Referring now to FIG. 8, in an embodiment, first and third devices 802 and 806, which may comprise one or more mobile devices and/or one or more hearing aids, for example, such as those described above in connection with FIGS. 1-7 of the present disclosure, may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 804, as depicted in FIG. 8, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, hearing aids, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802, which, as mentioned, may comprise, for example, a mobile device and/or a hearing aid such as those described above in connection with FIGS. 1-7 of the present disclosure, may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a device-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, at a mobile device, comprising:
    converting sound waves including speaking voices from one or more particular individuals into an electrical audio signal via a microphone of the mobile device;
    converting the electrical audio signal into one or more digital audio parameters utilizing, at least in part, one or more processors of the mobile device;
    generating, via one or more cameras of the mobile device, one or more signals and/or states representative of visual content pertaining to a particular environment in which the one or more particular individuals are speaking and/or in which the mobile device is currently located;
    detecting, utilizing the one or more processors, one or more parameters pertaining to the particular environment based at least in part on the visual content, wherein the one or more parameters pertaining to the particular environment include a parameter indicative of an indoor or outdoor environment; and
    adjusting one or more parameters of one or more hearing aids to enhance audibility or intelligibility of an audio signal based, at least in part, on the one or more digital audio parameters and the one or more parameters pertaining to the particular environment.

2. The method of claim 1, further comprising identifying at least one of the one or more particular individuals at least in part by comparing the one or more digital audio parameters with voiceprint content stored in a memory of the mobile device.

3. The method of claim 2, further comprising detecting one or more characteristics of the one or more particular individuals based on the visual content generated by the one or more cameras.

4. The method of claim 3, wherein the adjusting the one or more parameters of the one or more hearing aids comprises transmitting one or more signals and/or states comprising particular voiceprint content associated with the identified at least one of the one or more particular individuals to the one or more hearing aids via a communication interface of the mobile device.

5. The method of claim 4, wherein the transmitting the one or more signals and/or states to the one or more hearing aids comprises transmitting the one or more signals and/or states via a wireless type air interface.

6. The method of claim 4, wherein the voiceprint content is stored at the mobile device as part of one or more records of one or more contact lists, and wherein the one or more contact lists include one or more names, phone numbers, email addresses, or photographs, or any combination thereof.

7. The method of claim 4, further comprising generating the voiceprint content at least in part via analysis of audio content captured during one or more real-time phone conversations or captured as one or more voice messages, or a combination thereof.

8. The method of claim 4, wherein the adjusting the one or more parameters of the one or more hearing aids further comprises transmitting, via the communication interface, one or more signals and/or states representative of the one or more digital audio parameters, one or more signal and/or states representative of the one or more parameters pertaining to the particular environment, or one or more signals and/or states representative of the one or more characteristics of the one or more particular individuals, or a combination thereof, to the one or more hearing aids.

9. The method of claim 8, wherein the signals and/or states representative of the one or more parameters pertaining to the particular environment or the signals and/or states representative of the one or more characteristics of the one or more particular individuals, or a combination thereof, comprises one or more parameters representative of an approximate distance between the one or more particular individuals and the mobile device, an amount of particular individuals within a specified proximity of the mobile device, a gender of at least one of the one or more particular individuals, an approximate age of the at least one of the one or more particular individuals, or an identification of a particular indoor and/or outdoor environment, or a combination thereof.

10. A mobile device, comprising:
    a microphone to convert sound waves to include speaking voices from one or more particular individuals into an electrical audio signal;
    a processor to convert the electrical audio signal into one or more digital audio parameters;
    at least one camera to generate one or more signals and/or states representative of visual content pertaining to a particular environment in which the one or more particular individuals and/or the mobile device are currently located;
    the processor further to detect one or more parameters pertaining to the particular environment based at least in part on the visual content, wherein the one or more parameters pertaining to the particular environment include a parameter indicative of an indoor or outdoor environment; and adjust one or more parameters of one or more hearing aids to enhance audibility or intelligibility of an audio signal based, at least in part, on the one or more digital audio parameters and the one or more parameters pertaining to the particular environment.

11. The mobile device of claim 10, wherein the processor to identify at least one of the one or more particular individuals, the processor to compare the one or more digital audio parameters with voiceprint content to be stored in a memory of the mobile device.

12. The mobile device of claim 11, wherein the processor further to detect one or more characteristics of the one or more particular individuals based on the visual content generated by the one or more cameras.

13. The mobile device of claim 12, further comprising a communication interface, wherein, to adjust the one or more parameters of the one or more hearing aids, the communication interface to transmit to the one or more hearing aids one or more signals and/or states to comprise particular voiceprint content to be associated with the identified at least one of the one or more particular individuals.

14. The mobile device of claim 13, wherein, to transmit the one or more signals and/or states between to the one or more hearing aids, the communication interface to transmit the one or more signals and/or states via a wireless type air interface.

15. The mobile device of claim 13, further comprising a memory to store the voiceprint content as part of one or more records to comprise one or more contact lists to include one or more names, phone numbers, email addresses, or photographs, or any combination thereof.

16. The mobile device of claim 13, wherein the processor further to generate the voiceprint content at least in part via analysis of audio content to be captured via one or more real-time phone conversations or to be captured as one or more voice messages, or a combination thereof.

17. The mobile device of claim 13, wherein, to adjust the one or more parameters of one or more hearing aids, the processor further to initiate transmission of one or more signals and/or states representative of the one or more digital audio parameters through the communication interface, one or more signal and/or states representative of the one or more parameters to pertain to the particular environment, or one or more signals and/or states representative of the one or more characteristics of the one or more particular individuals, or a combination thereof, to the one or more hearing aids.

18. The mobile device of claim 17, wherein the signals and/or states representative of the one or more parameters to pertain to the particular environment or the signals and/or states representative of the one or more characteristics of the one or more particular individuals, or a combination thereof, to comprise one or more parameters representative of an approximate distance between the one or more particular individuals and the mobile device, an amount of particular individuals within a specified proximity of the mobile device, a gender of at least one of the one or more particular individuals, an approximate age of the at least one of the one or more particular individuals or an identification of a particular indoor and/or outdoor environment, or a combination thereof.

19. A system, comprising:
a mobile device to include:
a microphone to convert sound waves to include speaking voices from one or more particular individuals into an electrical audio signal;
a processor to convert the electrical audio signal into one or more digital audio parameters;
at least one camera to generate one or more signals and/or states representative of visual content pertaining to a particular environment in which the one or more particular individuals and/or the mobile device are currently located;
wherein the processor of the mobile device further to detect one or more parameters pertaining to the particular environment based at least in part on the visual content, wherein the one or more parameters pertaining to the particular environment include a parameter indicative of an indoor or outdoor environment;
a communication interface to transmit, via an air interface, one or more signals and/or states representative of the one or more digital audio parameters or the one or more parameters pertaining to the particular environment, or a combination thereof; and
one or more hearing aids to comprise:
a communication interface to receive, via the air interface, the one or more signals and/or states representative of the one or more parameters pertaining to the particular environment; and
a processor to adjust one or more parameters of the one or more hearing aids to enhance audibility or intelligibility of an audio signal based, at least in part, on the one or more wireless signals representative of the one or more digital audio parameters and the one or more parameters pertaining to the particular environment, or a combination thereof.

20. The system of claim 19, wherein the processor of the mobile device further to detect one or more characteristics of the one or more particular individuals based on the visual content generated by the one or more cameras, the communication interface of the mobile device further to transmit one or more signals and/or states representative of the one or more characteristics of the one or more particular individuals, wherein the one or more hearing aids to receive the one or more signals and/or states representative of the one or more characteristics of the one or more particular individuals, and wherein the one or more hearing aids to adjust the one or more parameters of the hearing aids based, at least in part, on the one or more characteristics of the one or more particular individuals.

* * * * *